E. B. WRIGHT.
DUST PAN.
APPLICATION FILED APR. 24, 1917.
1,262,294.
Patented Apr. 9, 1918.
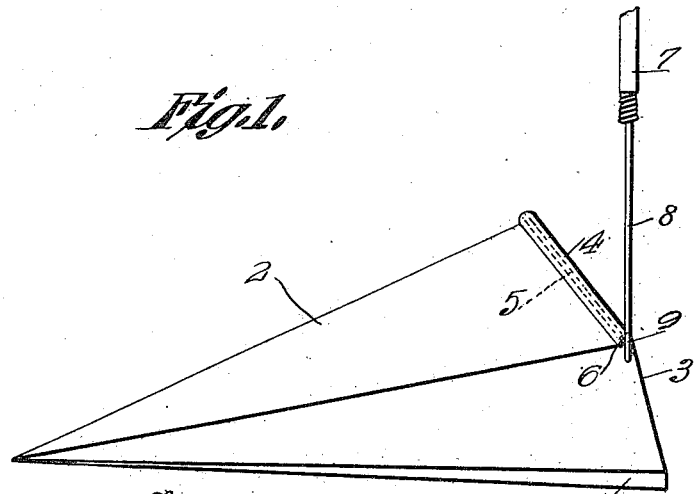
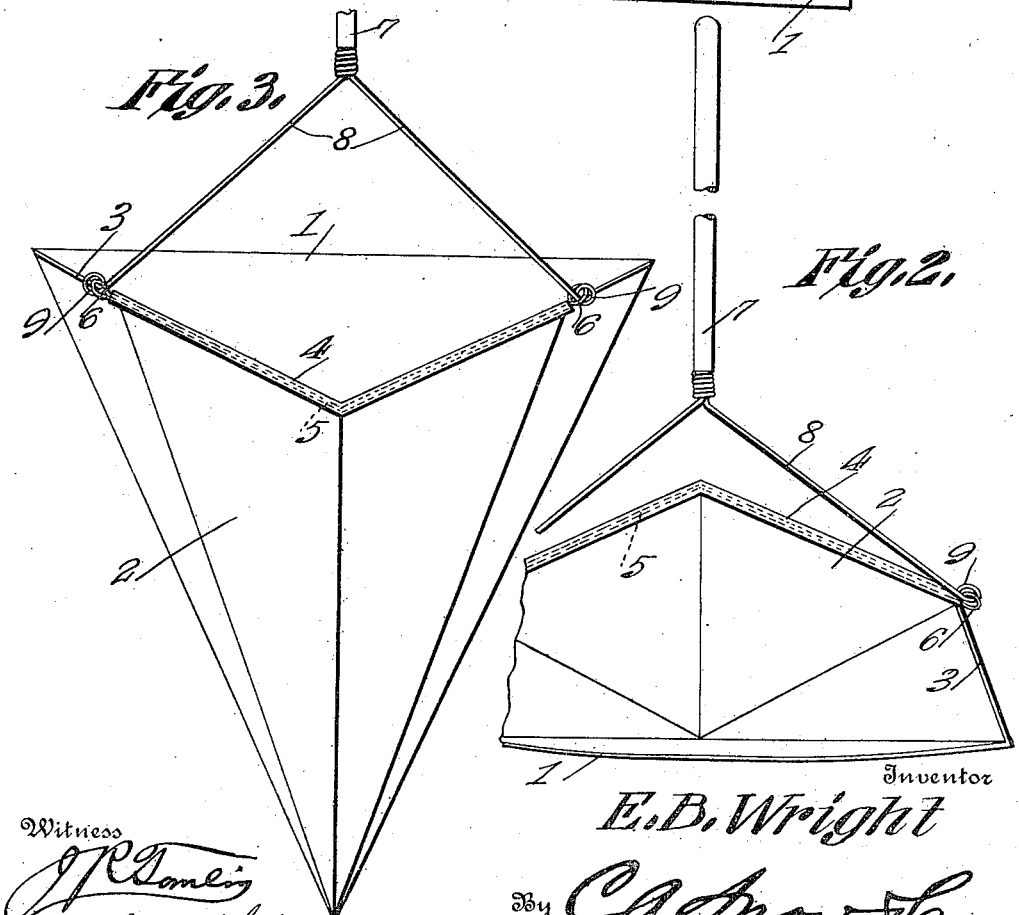
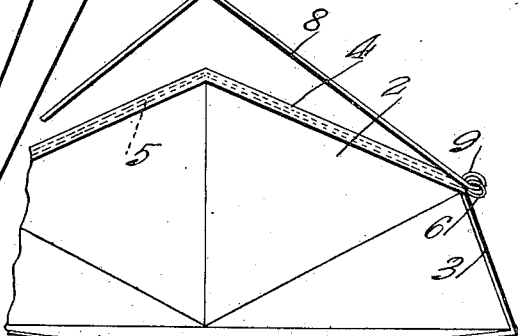
Witness
J. R. Tomlin
H. A. Mitchell
Inventor
E. B. Wright
By C. A. Snow & Co.
Attorney

UNITED STATES PATENT OFFICE.

ELISHA B. WRIGHT, OF NEWARK, CALIFORNIA.

DUST-PAN.

1,262,294. Specification of Letters Patent. Patented Apr. 9, 1918.

Application filed April 24, 1917. Serial No. 164,187.

*To all whom it may concern:*

Be it known that I, ELISHA BARZILLA WRIGHT, a citizen of the United States, residing at Newark, in the county of Alameda and State of California, have invented a new and useful Dust-Pan, of which the following is a specification.

The present invention appertains to dust pans, and aims to provide a device of that character which can be conveniently manipulated for receiving the sweepings and lifting them from the floor.

It is also the object of the invention to provide a dust pan of simple and inexpensive construction, which is easy to manufacture, and which is convenient, practical and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:—

Figure 1 is a front view of the improved dust pan.

Fig. 2 is a side elevation thereof.

Fig. 3 is an elevation illustrating the pan in suspended position for lifting the sweepings therewith.

The dust pan is of triangular or tapered form in plan, the same tapering from its mouth or open end to a point at its closed end. The dust pan has a slightly concaved resilient bottom 1 of triangular form, and a transversely arched top 2, the wider end of which is cut on an incline, as at 3, at the mouth or open end of the pan, whereby the sweepings can be readily swept into the pan over the free edge or lip of the bottom 1. The forward free edge of the top 2 is of inverted V-shape and is provided with a backwardly curled portion providing a rearwardly inclined V-shaped bead 4 terminating short of the edges of the top and bottom, and embracing an inverted V-shaped rearwardly inclined stiffening wire 5, the ends of which are provided with loops or eyes 6 projecting slightly beyond the ends of the bead 5 above the bottom 1 at points adjacent to and within the angles of the front corners of said bottom.

A wooden or other suitable handle 7 is employed, the same being provided at its lower end with a fork 8 having diverging arms provided at their free ends with loops or eyes 9 pivotally engaging the loops 6, whereby to pivotally connect the handle and pan.

In use, with the bottom of the pan resting upon the floor, the handle 7 can be pressed downwardly whereby to press the edge portion of the bottom downwardly, so that the bottom will straighten out or conform to the surface of the floor, whereby the sweepings pass over the free edge of the bottom into the pan. It will be noted that the fork 8 of the handle being connected to the ends of the arched or inverted V-shaped reinforcing wire 5, will properly transmit the pressure from the handle to the pan, without distorting the pan, and the terminal loops 6 of the wire 5 are located behind the vertical plane of the forward edge of the bottom 1, whereby the downward pressure will hold the pan firmly in place upon the floor. The pan can be conveniently lifted by lifting the handle in which event the pan will swing to a vertical pendant position, as seen in Fig. 3, with the sweepings therein. The sweepings can then be dumped readily.

Having thus described the invention, what is claimed as new is:—

A dust pan having a bottom and an arched top tapering rearwardly from the open end thereof, the forward edge of said top having a rearwardly inclined V-shaped bead terminating short of the edges of the top and bottom, an inverted V shaped rearwardly inclined stiffening wire within said bead having its ends projecting and provided with loops above points adjacent to and within the angles of the front corners of the bottom, and a handle having a fork provided at its ends with eyes pivotally engaging the aforesaid eyes.

In testimony that I claim the foregoing as my own, I have hereto affixed my signature in the presence of two witnesses.

ELISHA B. WRIGHT.

Witnesses:
ROBT. J. MITCHEL,
A. T. BIDDLE.

Copies of this patent may be obtained for five cents each, by addressing the "Commissioner of Patents, Washington, D. C."